United States Patent

Ishii et al.

[11] Patent Number: 5,774,189
[45] Date of Patent: Jun. 30, 1998

[54] ON SCREEN DISPLAY

[75] Inventors: Etsuko Ishii; Osamu Hosotani, both of Tokyo, Japan

[73] Assignee: Mitsubishi Denki Kabushiki Kaisha, Tokyo, Japan

[21] Appl. No.: 570,435

[22] Filed: Dec. 11, 1995

[30] Foreign Application Priority Data

Dec. 12, 1994 [JP] Japan .................................. 6-307693
Nov. 24, 1995 [JP] Japan .................................. 7-306151

[51] Int. Cl.$^6$ ........................ H04N 5/278; H04N 5/445
[52] U.S. Cl. ........................ 348/563; 348/567; 348/569; 348/589; 348/600; 348/590; 345/141
[58] Field of Search ........................ 345/141, 143; 348/563, 564, 565, 566, 567, 569, 589, 590, 600; H04N 5/278, 5/445

[56] References Cited

U.S. PATENT DOCUMENTS

| | | | |
|---|---|---|---|
| 3,345,458 | 10/1967 | Cole et al. | 345/141 |
| 3,911,420 | 10/1975 | Lampson | 340/324 AD |
| 4,633,297 | 12/1986 | Skerlos et al. | 358/22 |
| 5,541,663 | 7/1996 | Ohno | 348/478 |

FOREIGN PATENT DOCUMENTS

| | | | |
|---|---|---|---|
| 62-150288 | 7/1987 | Japan . | |
| 5183830 | 7/1993 | Japan | 348/569 |
| 5284438 | 10/1993 | Japan | 348/569 |

Primary Examiner—Glenton B. Burgess
Attorney, Agent, or Firm—McDermott, Will & Emery

[57] ABSTRACT

The OSD includes a plurality of holding circuits for outputting to a mixing circuit pixel data for characters or patterns synchronously with a horizontal synchronization signal, wherein the pixel data for the characters or patterns to be displayed are supplied to the holding circuits by a memory through a plurality of channels, the number of which is equal to the number of the holding circuits, so that a display signal for displaying the pixel data in a plurality of display areas is generated by the mixing circuit.

9 Claims, 10 Drawing Sheets

ON SCREEN DISPLAY

BACKGROUND OF THE INVENTION

1. Field of the Invention

The present invention relates to an on screen display (on screen display circuit; hereinafter referred to as an OSD) that can display a plurality of display areas simultaneously on one display screen.

2. Description of Related Art

FIG. 1 is a block diagram showing the configuration of an exemplified conventional OSD. The OSD 1 comprises a display demand signal generator 2 for outputting, synchronously with a horizontal synchronization signal generated by a horizontal synchronization signal generator 9, a display demand signal having a train of pulses with regard to a group of pixels corresponding to each character starting from an optional point on a display screen of a TV monitor 10 under instruction of a microprocessing unit (hereinafter referred to as the MPU) 8; a RAM 3 for reading and outputting character codes inputted through the MPU 8 to be stored therein in response to the display demand signal; and an OSD ROM 4 for reading stored font data for characters in response to the receipt of the character codes and outputting a portion of the read font data corresponding to one pixel line of the display area.

The OSD 1 further comprises a shift register 6 that temporarily stores the font data corresponding to one pixel line of the display area outputted by the OSD ROM 4 and then successively outputs the data bit by bit of each pixel synchronously with a horizontal synchronization signal, and a mixing circuit 7 for mixing the font data with an image signal of the TV monitor 10 synchronously with a horizontal synchronization signal by applying a color signal to each bit of the font data, so that the characters are displayed at a predetermined position on the display screen of the TV monitor 10.

The OSD 1 is operated as follows:

The horizontal synchronization signal generator 9 outputs a horizontal synchronization signal that is synchronized with a starting time of a horizontal scanning line on the display screen of the TV monitor 10. The display demand signal generator 2 counts up the horizontal synchronization signal, and outputs to the RAM 3 display demand signals for a required number of characters, for example, from the first character up to the second or third character, etc., synchronously with a horizontal synchronization signal when a display position corresponding to the count value reaches a font display position optionally set by the MPU 8.

The RAM 3 stores character codes optionally set by the MPU 8, and successively reads out the character codes in response to the display demand signal to output the read character codes to the OSD ROM 4.

The OSD ROM 4 successively reads out the font data corresponding to the inputted character codes by using the character codes as addresses, and outputs the font data for one pixel line of the display area to the shift register 6 when all the font data for one display area are finished to be read.

In response to the input of the font data for one pixel line in the display area, the shift register 6 successively outputs the font data bit by bit to the mixing circuit 7.

In response to the input of each bit of the font data, the mixing circuit 7 applies a predetermined color signal thereto, and mixes the signal with an image signal of the TV monitor 10 synchronously with a horizontal synchronization signal, so that characters corresponding to the font data are displayed at a predetermined position on the display screen of the TV monitor 10.

After outputting the font data for one pixel line of the display area, the shift register 6 receives the font data for a subsequent pixel line from the OSD ROM 4. The above described procedure is repeated thereafter, resulting in displaying a train of characters optionally set by the MPU 8 at the font display position on the display screen of the TV monitor 10 optionally set by the MPU 8.

Referring to FIG. 2, a first display area on a TV screen 10a (corresponding to the aforementioned display screen, merely part of which is herein shown) is an example of the display area displaying characters by the above described operation.

The conventional OSD 1, however, can display merely one display area as is shown in FIG. 2 as the first display area. A plurality of OSDs are required to display a plurality of display areas including a second display area shown with broken lines in FIG. 2. This causes a problem of disadvantageously increasing the circuit scale and the chip area. Japanese Patent Application Laid-Open No. 62-150288 (1987) discloses a counter measure to solve this problem, in which part of an OSD is commonly used. This counter measure is not sufficient and still requires further improvement.

SUMMARY OF THE INVENTION

The present invention is directed to solve the aforementioned problems. One object of the invention is providing an OSD that can display a plurality of display areas, without increasing the circuit scale, as in the case where a plurality of OSDs are used.

The OSD of this invention comprises a plurality of holding circuits each of which temporarily holds pixel data for characters or patterns and then outputs the pixel data synchronously with a horizontal synchronization signal, a display demand signal generator for outputting a display demand signal for the characters or patterns with regard to each group of a predetermined number of pixels starting from an optional pixel on a display screen, in synchronism with each group, a first memory for outputting a plurality of codes corresponding to the characters or patterns for the respective holding circuits, a second memory for outputting a plurality of pixel data corresponding to the plurality of codes to the respective holding circuits, and a mixing circuit receiving the pixel data outputted by the respective holding circuits as display signals.

In this manner, the first memory outputs a plurality of codes corresponding to the characters or patterns for the respective holding circuits, and the second memory outputs a plurality of pixel data corresponding to the plurality of codes to the respective holding circuits. The plurality of holding circuits, after temporarily holding the respective pixel data, output the pixel data synchronously with a horizontal synchronization signal. The mixing circuit receives the pixel data outputted by the respective holding circuits as display signals so as to display the characters or patterns corresponding to the respective holding circuits on the display screen.

Another object of the invention is providing an OSD that can determine, when a plurality of display areas overlap, whether any of the displays is to be priorly displayed or the displays are to be overlapped.

In this aspect, the OSD of the invention comprises, in addition to the aforementioned elements, a priority storage circuit for storing a display priority signal for determining whether the pixel data from any of the holding circuits are priorly used as display signals or the pixel data from all the holding circuits are used as display signals, when the pixel data from the plurality of holding circuits overlap on one pixel. In accordance with the contents of the priority storage circuit, the mixing circuit uses any or all of the pixel data from the respective holding circuits as the display signals.

Accordingly, when the pixel data from the plurality of holding circuits overlap on one pixel, the mixing circuit selects the pixel data from the respective holding circuits as the display signals under instruction of the priority storage circuit to use the pixel data from any of the holding circuits priorly or to use all the pixel data from all the holding circuits as the display signals.

Still another object of the invention is providing an OSD that can enlarge characters or patterns to be displayed.

In this aspect, the OSD of the invention comprises, in addition to the aforementioned elements, a frequency divider for dividing the display demand signal having a train of pulses and inputting the divided train of pulses to the first memory. Therefore, the frequency divider divides the display demand signal having a train of pulses and inputs the divided train of pulses to the first memory, which outputs codes corresponding to characters or patterns to be displayed at a speed in accordance with the divided train of pulses, resulting in enlarging the characters or patterns to be displayed.

In another aspect, the OSD of the invention comprises an image size storage circuit for storing a signal corresponding to a dividing ratio for a frequency divider, and a frequency divider that determines its dividing ratio on the basis of the contents of the image size storage circuit. Accordingly, the frequency divider determines its dividing ratio in accordance with the contents of the image size storage circuit, thereby selecting the size of characters or patterns to be displayed.

In still another aspect, the OSD of the invention comprises a plurality of frequency dividers having the respective dividing ratios. Therefore, characters or patterns corresponding to the respective holding circuits can be set to be displayed in different sizes.

The above and further objects and features of the invention will more fully be apparent from the following detailed description with accompanying drawings.

DESCRIPTION OF THE PREFERRED EMBODIMENTS

The present invention will now be described referring to the accompanying drawings.

Figure 3:
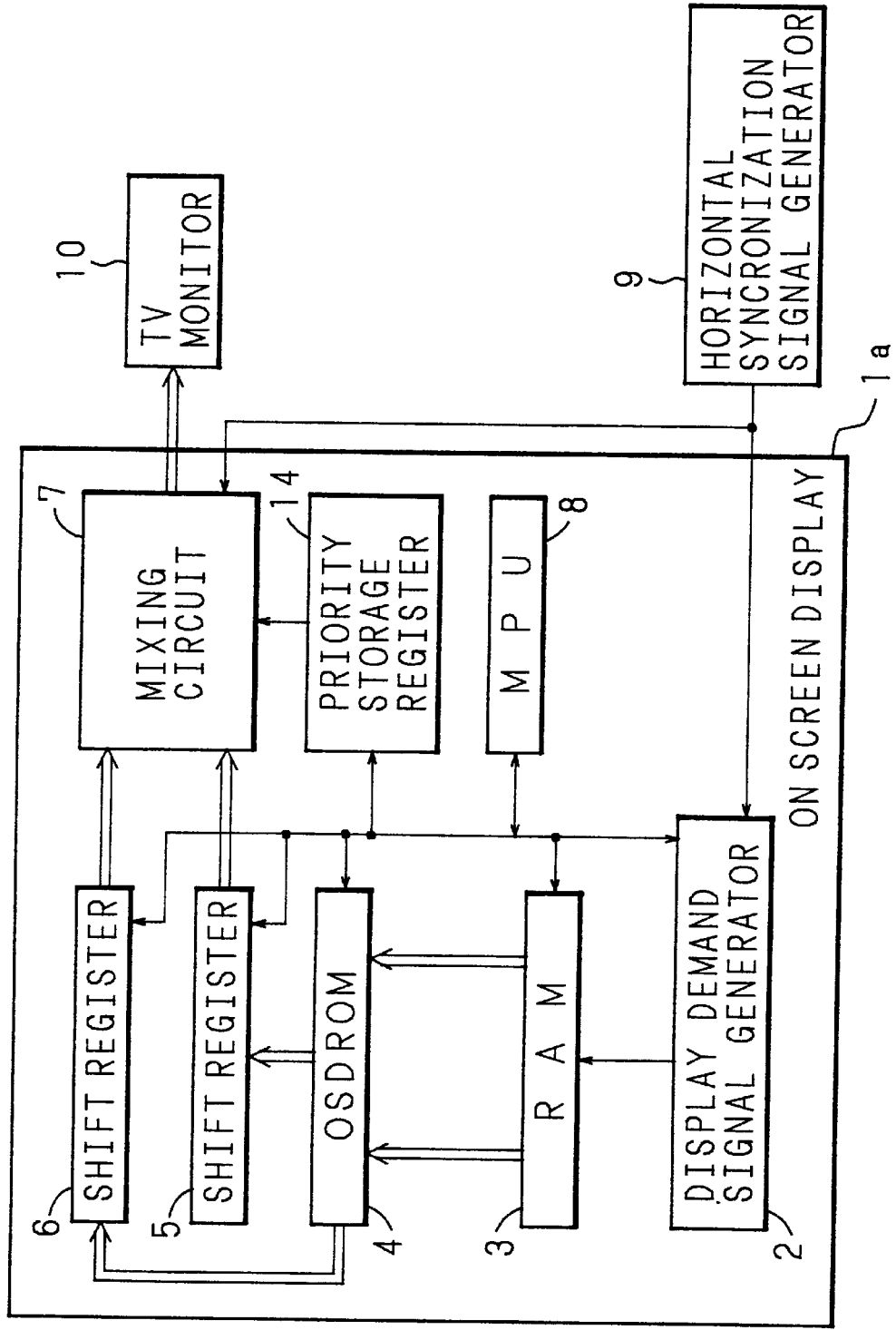
FIG. 3 is a block diagram of the configuration of an OSD of Embodiment 1 of the invention.

Embodiment 1:

FIG. 3 is a block diagram showing the configuration of an exemplified OSD of the invention. The OSD 1a comprises a display demand signal generator 2 for outputting, synchronously with a horizontal synchronization signal generated by a horizontal synchronization signal generator 9, a display demand signal having a train of pulses with regard to a group of pixels corresponding to each character starting from an optional point on a display screen of a TV monitor 10 under instruction of an MPU 8; a RAM 3 for reading and outputting stored codes for characters to be displayed in two display areas, which are previously inputted through the MPU 8, in response to the display demand signal; and an OSD ROM 4 for reading font data for the codes for the characters to be displayed in the two display areas from stored character font data therein and outputting a portion of the read font data corresponding to one pixel line in each of the two display areas.

The OSD 1a further comprises two shift registers 5 and 6 that temporarily store the portion of the font data for one pixel line in each display area outputted by the OSD ROM 4 and successively output the font data bit by bit synchronously with a horizontal synchronization signal, and a mixing circuit 7 that mixes the font data with an image signal of the TV monitor 10 synchronously with a horizontal synchronization signal by applying a color signal to each bit of the font data for the two display areas, so that desired characters are displayed at predetermined positions in the respective display areas on the display screen of the TV monitor 10.

The OSD 1a additionally comprises a priority storage register 14 that is supplied with and stores a signal corresponding to the display priority of the two display areas by the MPU 8. The mixing circuit 7 selects, in accordance with the contents of the priority storage register 14, whether either of the two display areas is to be priorly displayed or the two display areas are to be ORed, and mixes the signal with the image signal of the TV monitor 10.

The OSD 1a is operated as follows:

The horizontal synchronization signal generator 9 outputs a horizontal synchronization signal synchronized with a starting time of a horizontal scanning line of the display screen of the TV monitor 10. The display demand signal generator 2 counts up the horizontal synchronization signal, and outputs to the RAM 3 display demand signals for a required number of characters, for example, from the first character up to the second or third character, etc., synchronously with a horizontal synchronization signal when a display position corresponding to the count value reaches a font display position optionally set by the MPU 3. These display demand signals are generated to cover each display area.

The RAM 3 stores character codes for the two display areas optionally set by the MPU 8, and successively reads out character codes for the two display areas through two channels, respectively, in response to display demand signals to output them to the OSD ROM 4.

The OSD ROM 4 successively reads out the font data for desired characters in response to the inputted character codes for the two display areas through two channels, respectively, and when the font data for one display area are finished to be read, a portion of the font data corresponding to one pixel line in the each display area is outputted to the shift register 5 or 6.

The shift registers 5 and 6, after receiving the font data for one pixel line in the respective display areas, successively output the font data bit by bit to the mixing circuit 7.

The mixing circuit 7, after receiving each bit of the font data, applies a predetermined color signal to the bit, and mixes the signal with an image signal of the TV monitor 10 synchronously with a horizontal synchronization signal, so that predetermined characters are displayed at a predetermined position on the display screen of the TV monitor 10.

At this point, with regard to a portion where the two display areas overlap, the mixing circuit 7 determines whether either of the two display areas is to be priorly displayed or the two display areas are to be ORed, on the basis of the contents of the priority storage circuit 14, and mixes the resultant signal with an image signal of the TV monitor 10.

The shift registers 5 and 6, after outputting the font data for one pixel line in the respective display areas, receive the font data corresponding to a subsequent pixel line from the OSD ROM 4, and the aforementioned operation is repeated thereafter. Finally, two character trains optionally set by the MPU 8 are displayed on the font display positions optionally set by the MPU 8 on the display screen of the TV monitor 10.

Figure 4:
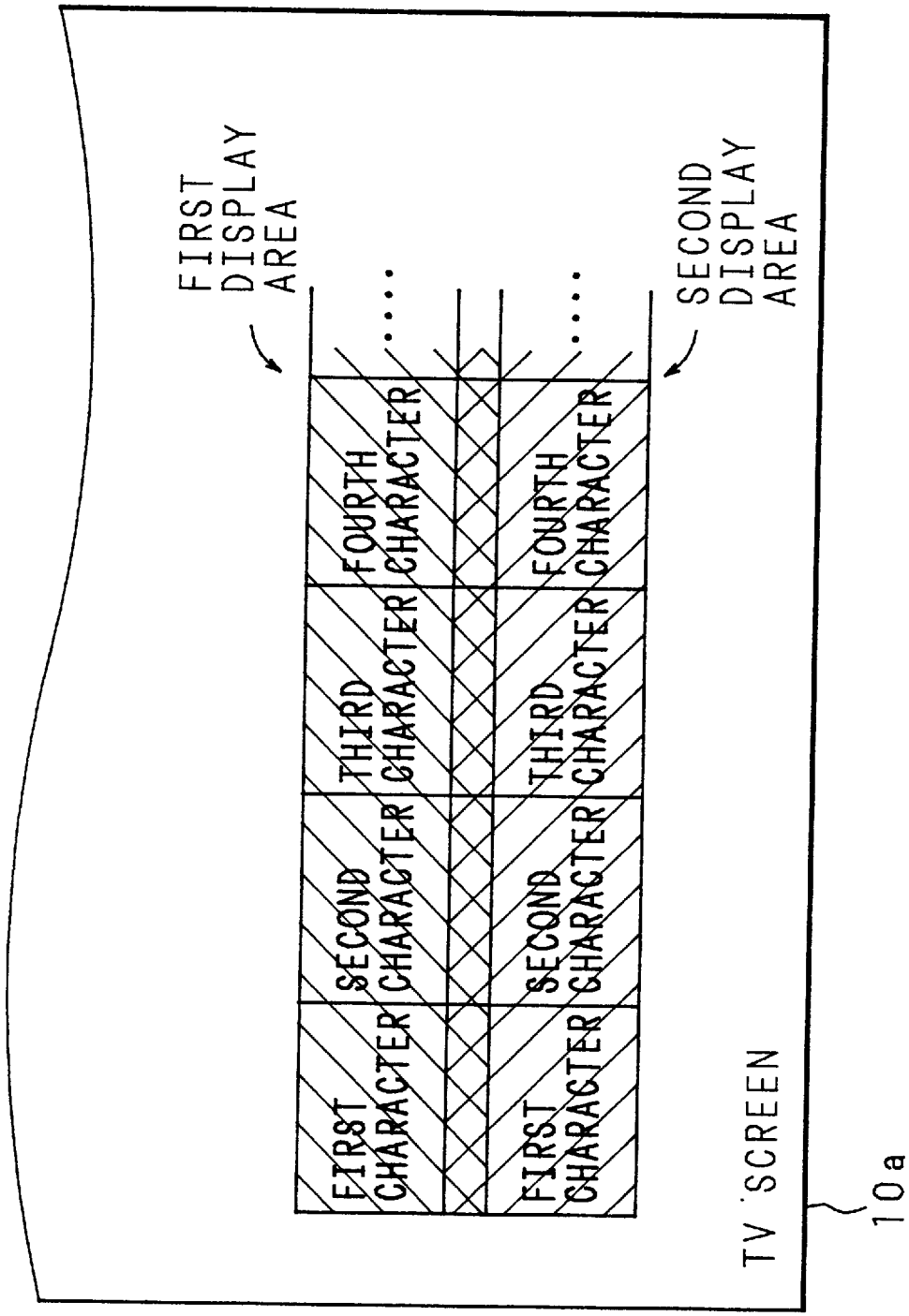
FIG. 4 illustrates display areas attainable by the operation of the OSD of FIG. 3.

Referring to FIG. 4, a first display area and a second display area on a TV screen 10*a* (i.e., the above-described display screen merely part of which is shown in FIG. 4) are examples of the display areas attained by the aforementioned operation. The first display area and the second display area overlap around the boundary thereof, and the display areas are ORed in the case of the display screen 10*a* shown in FIG. 4.

Figure 1:
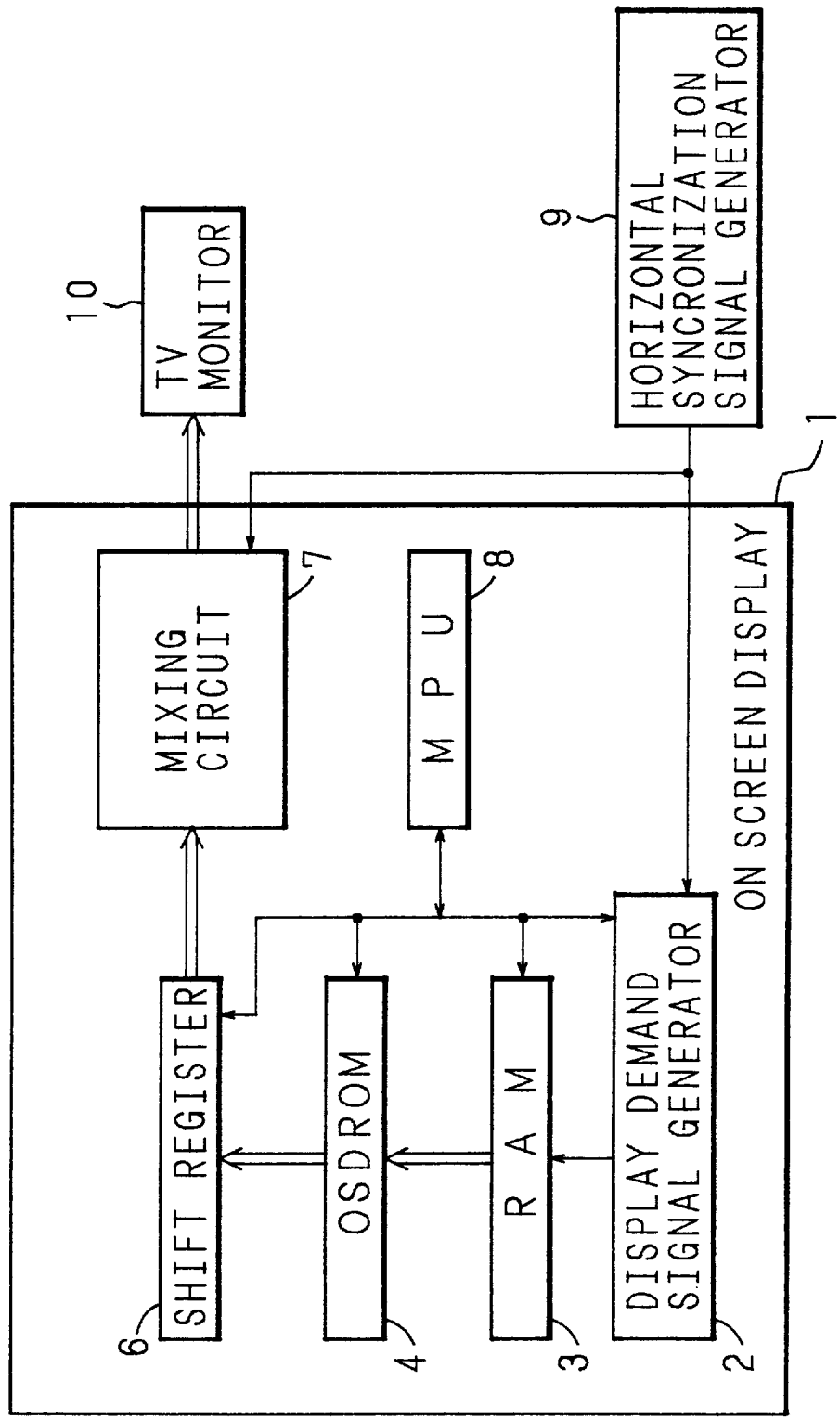
FIG. 1 is a block diagram of the configuration of a conventional OSD.
Figure 2:
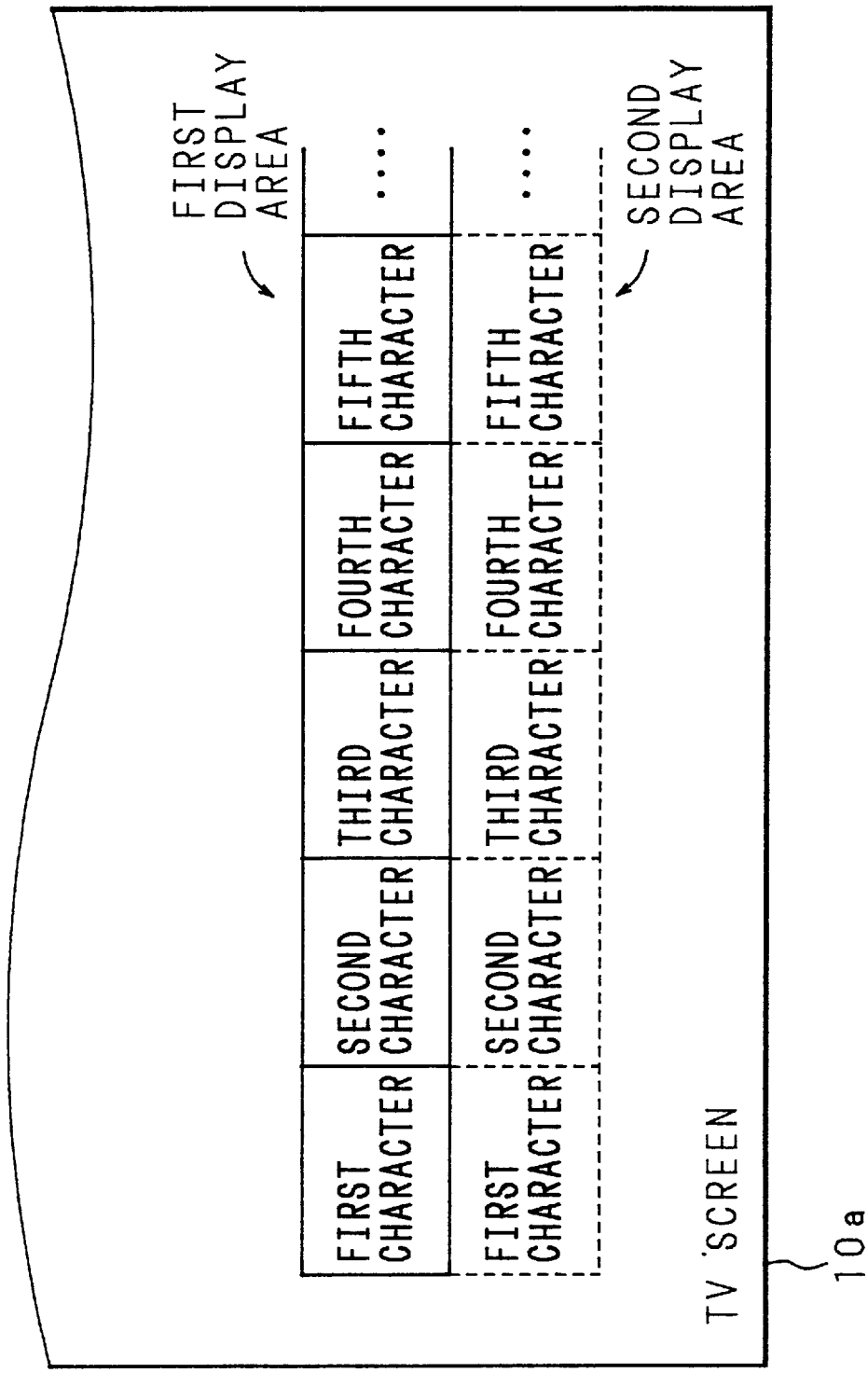
FIG. 2 illustrates a display area attainable by the operation of the conventional OSD.

In this OSD 1*a*, which is obtained by adding an extra shift register 5 to the conventional OSD 1 of FIG. 1, it is possible to display two display areas with ease without largely increasing the circuit scale.

Figure 5:
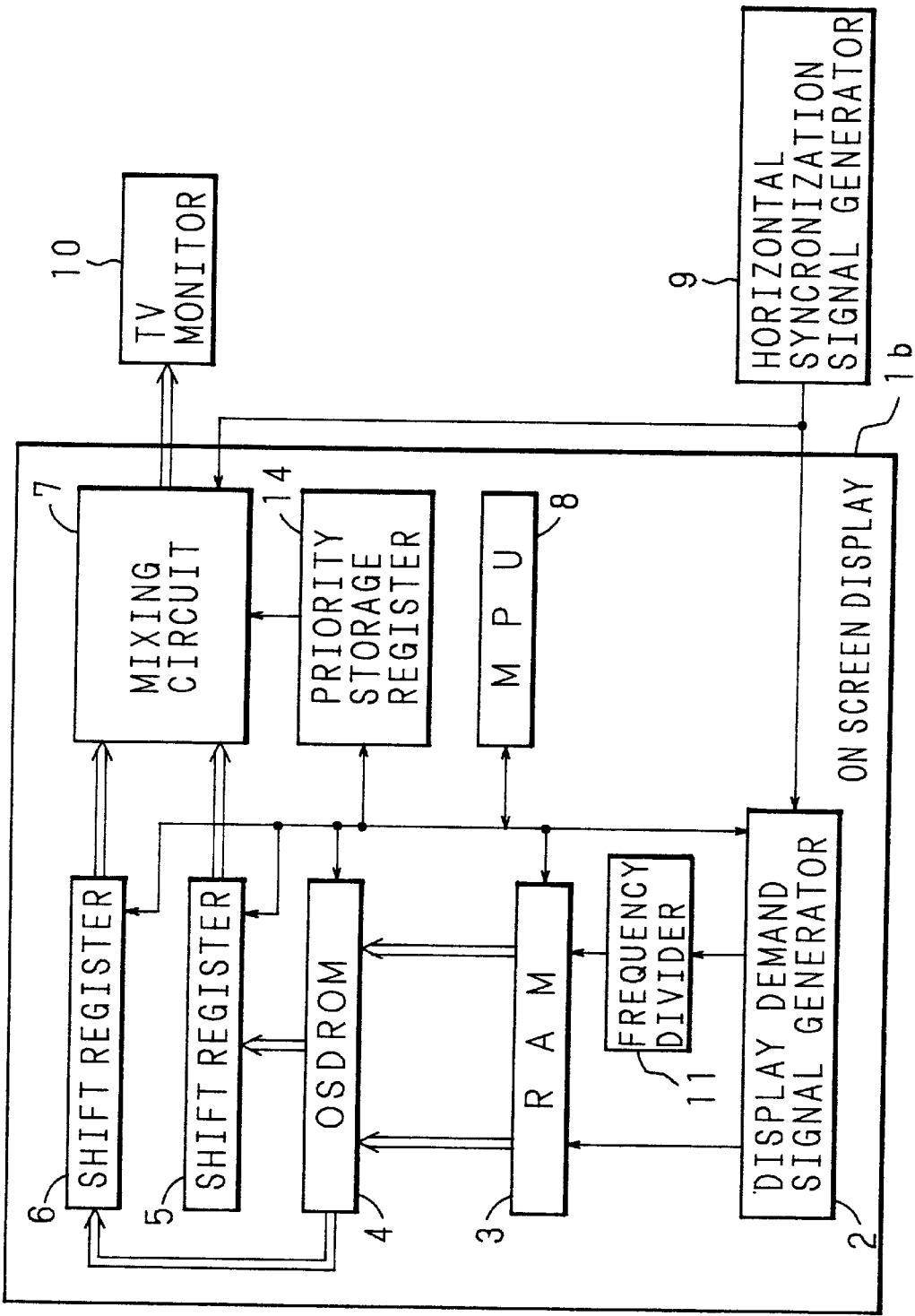
FIG. 5 is a block diagram of the configuration of an OSD of Embodiment 2 of the invention.

Embodiment 2:

FIG. 5 is a block diagram of another exemplified OSD of the invention. The OSD 1*b* takes out two trains of pulses of display demand signals generated by a display demand signal generator 2, and transfers one of the trains of pulses directly to a RAM 3 and the other to the RAM 3 through, for example, a ½ frequency divider 11. The rest of the configuration of this OSD 1*b* is identical to that of the OSD 1*a* described in Embodiment 1, and hence the description is omitted.

The OSD 1*b* is operated as follows:

A horizontal synchronization signal generator 9 outputs a horizontal synchronization signal synchronized with a starting time of a horizontal scanning line of a display screen of a TV monitor 10. The display demand signal generator 2 counts up the horizontal synchronization signal. When a display position corresponding to the count value reaches a font display position optionally set by an MPU 8, display demand signals for a required number of characters, for example, from the first character up to the second or third character, etc., are outputted synchronously with a horizontal synchronization signal to the RAM 3.

At this point, the display demand signal is divided into two trains of pulses, one of which is directly inputted to the RAM 3, and the other of which is divided by the frequency divider 11 and then inputted to the RAM 3.

The RAM 3 stores character codes for two display areas optionally set by the MPU 8. The character codes for one of the display areas that are to be read out synchronously with a display demand signal are successively read out in response to the display demand signals as is in the conventional OSD and are outputted to an OSD ROM 4. The character codes for the other display area that are read synchronously with another display demand signal divided by the frequency divider 11 are outputted to the OSD ROM 4 at a speed twice as slow as that for the former character codes.

Figure 6:
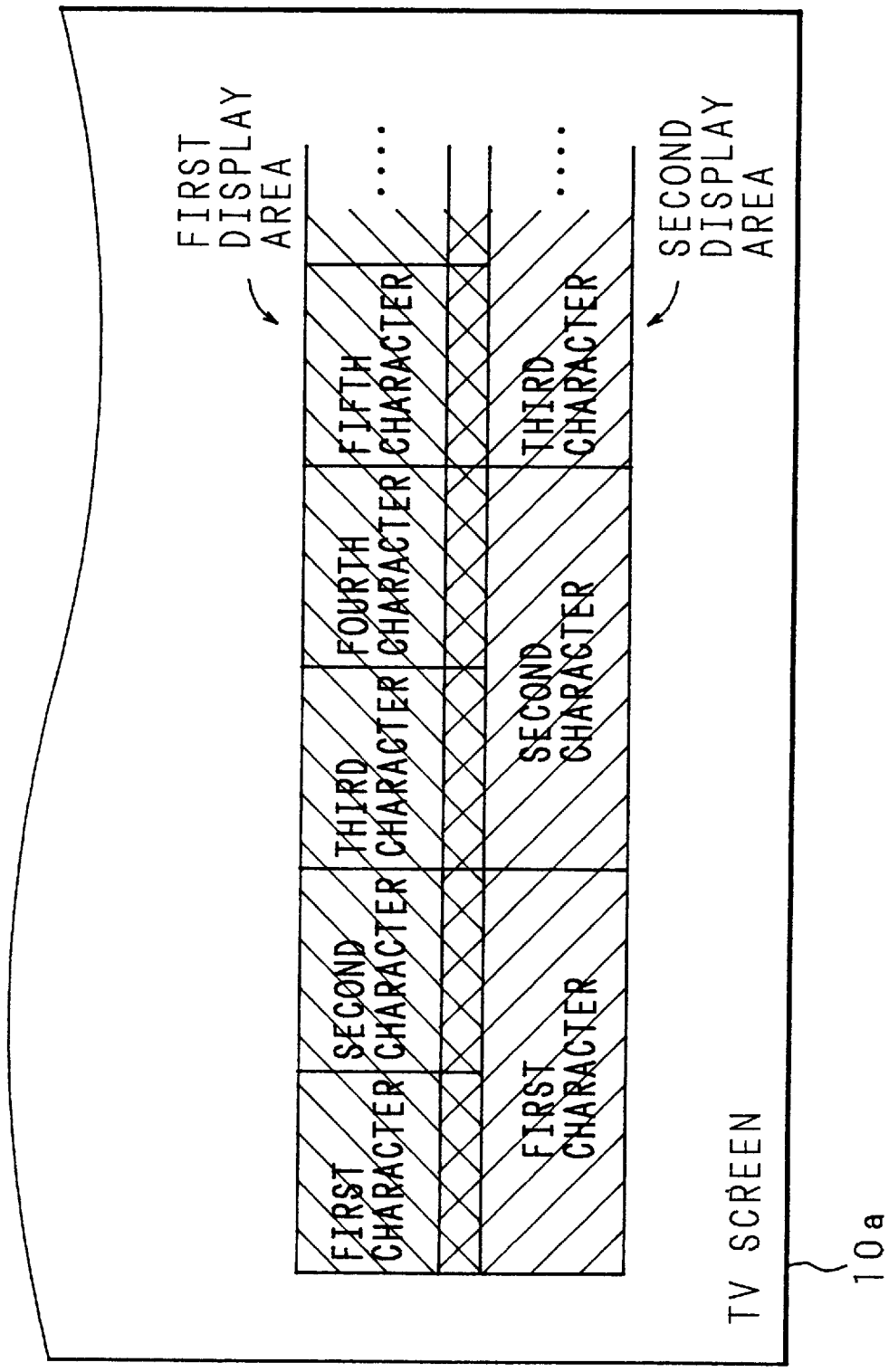
FIG. 6 illustrates display areas attainable by the operation of the OSD of FIG. 5.

Owing to this configuration, the font data for one display area read synchronously with the display demand signal having been divided by the frequency divider 11 are inputted to a shift register for that display area (herein indicated as a shift register 5), and the frequency of the font data is twice as long as the other font data read synchronously with the undivided display demand signal. As a result, each character displayed in this display area has a width twice as large as a character displayed in the other display area as is shown in a second display area in FIG. 6. The rest of the operation of the OSD 1*b* is identical to that of the OSD 1*a* described in Embodiment 1, and hence the description is omitted.

In this manner, the OSD 1*b* can display characters having different sizes in the respective display areas with ease, merely by adding an extra frequency divider 11 to the conventional OSD 1 without largely increasing the circuit scale.

Figure 7:
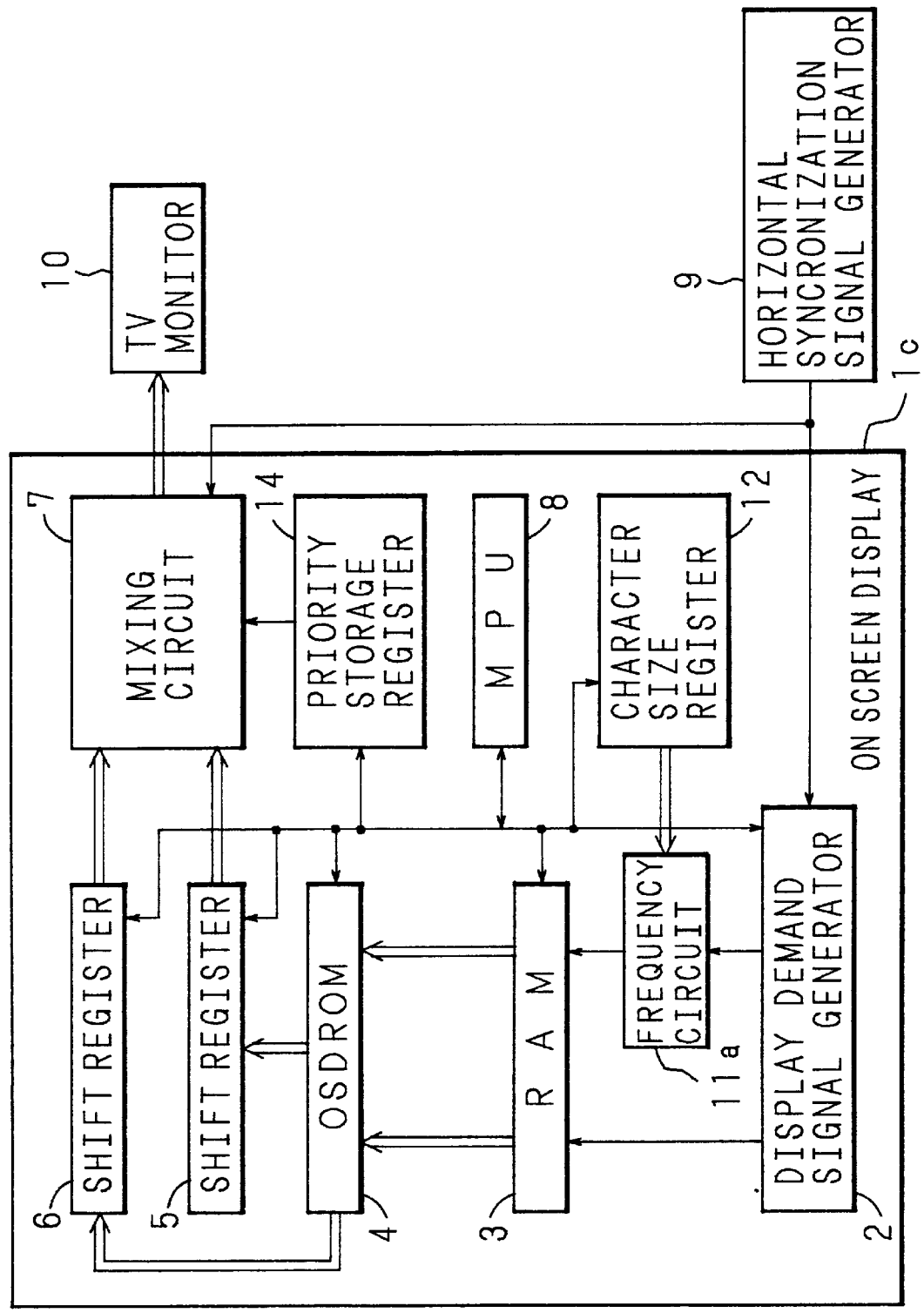
FIG. 7 is a block diagram of the configuration of an OSD of Embodiment 3 of the invention.

Embodiment 3:

FIG. 7 is a block diagram of still another exemplified OSD of the invention. The OSD 1*c* takes out two trains of pulses of a display demand signal generated by a display demand signal generator 2, and transfers one of the trains of pulses directly to a RAM 3, and the other to the RAM 3 through, for example, a ½ frequency divider 11*a*. A character size register 12 stores a signal corresponding to a dividing ratio of the frequency divider 11*a* inputted by an MPU 8, and the contents of the character size register 12 is supplied to the frequency divider 11*a*. In accordance with the received signal from the character size register 12, the frequency divider 11*a* switches its dividing ratio.

For example, when the character size register 12 stores "00", the frequency divider 11*a* divides a train of pulses received from the display demand signal generator 2 in a dividing ratio of 1 (i.e., performs no division), and outputs the resultant signal.

When the character size register 12 stores "01", the frequency divider 11*a* divides the train of pulses of the display demand signal from the display demand signal generator 2 in a dividing ratio of 2, i.e., divides the train of pulses into two, and outputs the resultant signal. The rest of the configuration and the operation of the OSD 1*c* is identical to that of the OSD 1*b* of Embodiment 2, and hence the description is omitted.

In this manner, the OSD 1*c* can select the size of characters to be displayed with ease through the usage of the MPU 8 merely by including the character size register 12 without largely increasing the circuit scale.

Figure 8:
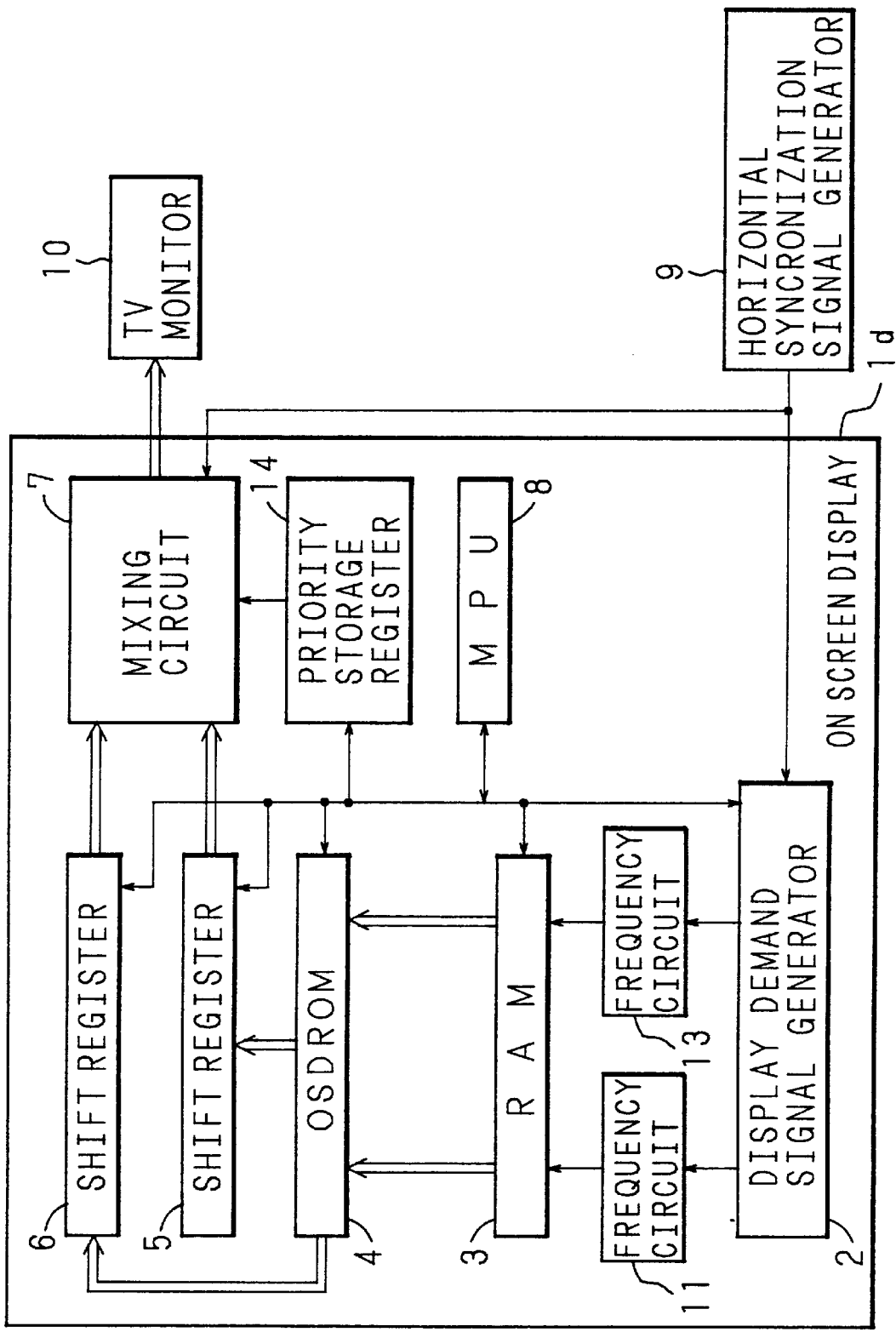
FIG. 8 is a block diagram of the configuration of an OSD of Embodiment 4 of the invention.

Embodiment 4:

FIG. 8 is a block diagram of still another exemplified OSD of the invention. The OSD 1*d* takes out two trains of pulses of a display demand signal generated by a display demand signal generator 2, one of which is divided by, for example, a ½ frequency divider 11, and the other of which is divided by, for example, a ⅓ frequency divider 13. Both the divided trains of pulses are then inputted to a RAM 3. The rest of the configuration is identical to that of the OSD 1*a* of Embodiment 1, and hence the description is omitted.

The OSD 1*d* is operated as follows:

A horizontal synchronization signal generator 9 outputs a horizontal synchronization signal synchronized with a starting time of a horizontal scanning line of a display screen of a TV monitor 10. The display demand signal generator 2 counts up the horizontal synchronization signal, and outputs to the RAM 3 a display demand signal for a required number of characters, for example, from the first character up to the second or third character, etc., synchronously with a horizontal synchronization signal when a display position corresponding to the count value reaches a font display position optionally set by an MPU 8.

Then, the display demand signal is separated into two, one of which is divided by the ½ frequency divider 11, the other by the ⅓ frequency divider 13, and the resultant signals are inputted to the RAM 3.

The RAM 3 stores character codes for two display areas optionally set by the MPU 8. The character codes for one display area that are read synchronously with a display demand signal having been divided by the frequency divider 11 are outputted to an OSD ROM 4 at a speed twice as slow as that for a character code read synchronously with an undivided display demand signal. The character codes for the other display area that are read synchronously with a display demand signal having been divided by the frequency divider 13 are outputted to the OSD ROM 4 at a speed three times as slow as that for a character code read synchronously with an undivided display demand signal.

As a result, the font data for one display area that are read synchronously with the display demand signal divided by the frequency divider 11 are inputted to a shift register for that display area (herein indicated as a shift register 6), and the frequency of the font data is twice as long as that of a font data read synchronously with an undivided display demand signal, resulting in the width of a character to be displayed in that display area being twice as large as that of a character displayed without the division.

The font data for the other display area that are read synchronously with the display demand signal divided by the frequency divider 13 arc inputted to a shift register for that display area (herein indicated as a shift register 5), and the frequency of the font data is three times as long as that of a font data read synchronously with an undivided display demand signal, resulting in the width of a character to be displayed in that display area being three times as large as that of a character displayed without the division.

Figure 9:
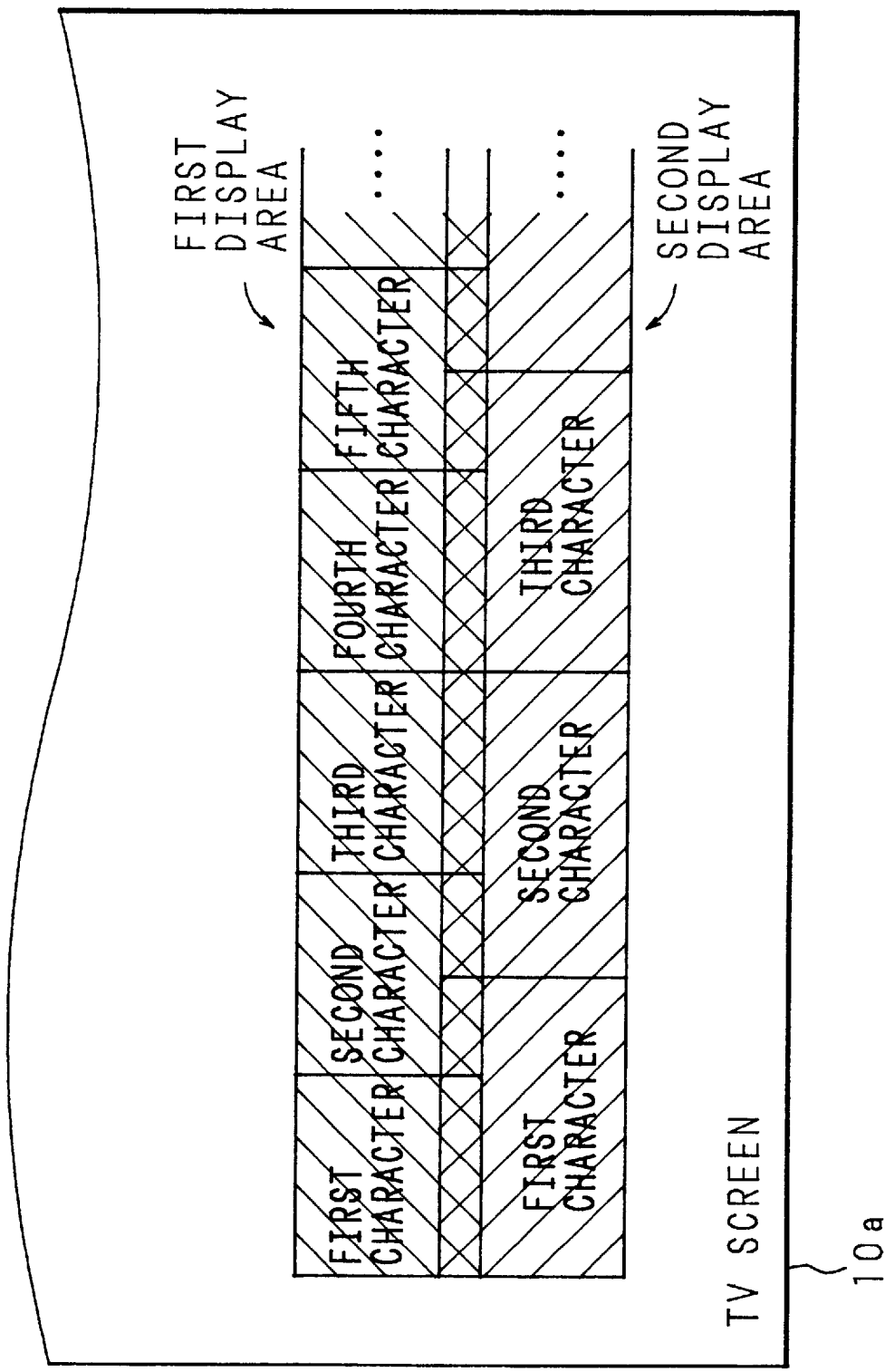
FIG. 9 illustrates display areas attainable by the operation of the OSD of FIG. 8.

Owing to this configuration, the ratio of the width of the characters displayed in the first display area to that of the characters displayed in the second display area is 1:1.5 as is shown in FIG. 9. The rest of the operation of this OSD 1d is identical to that of the OSD 1a of Embodiment 1, and hence the description is omitted.

Figure 10:
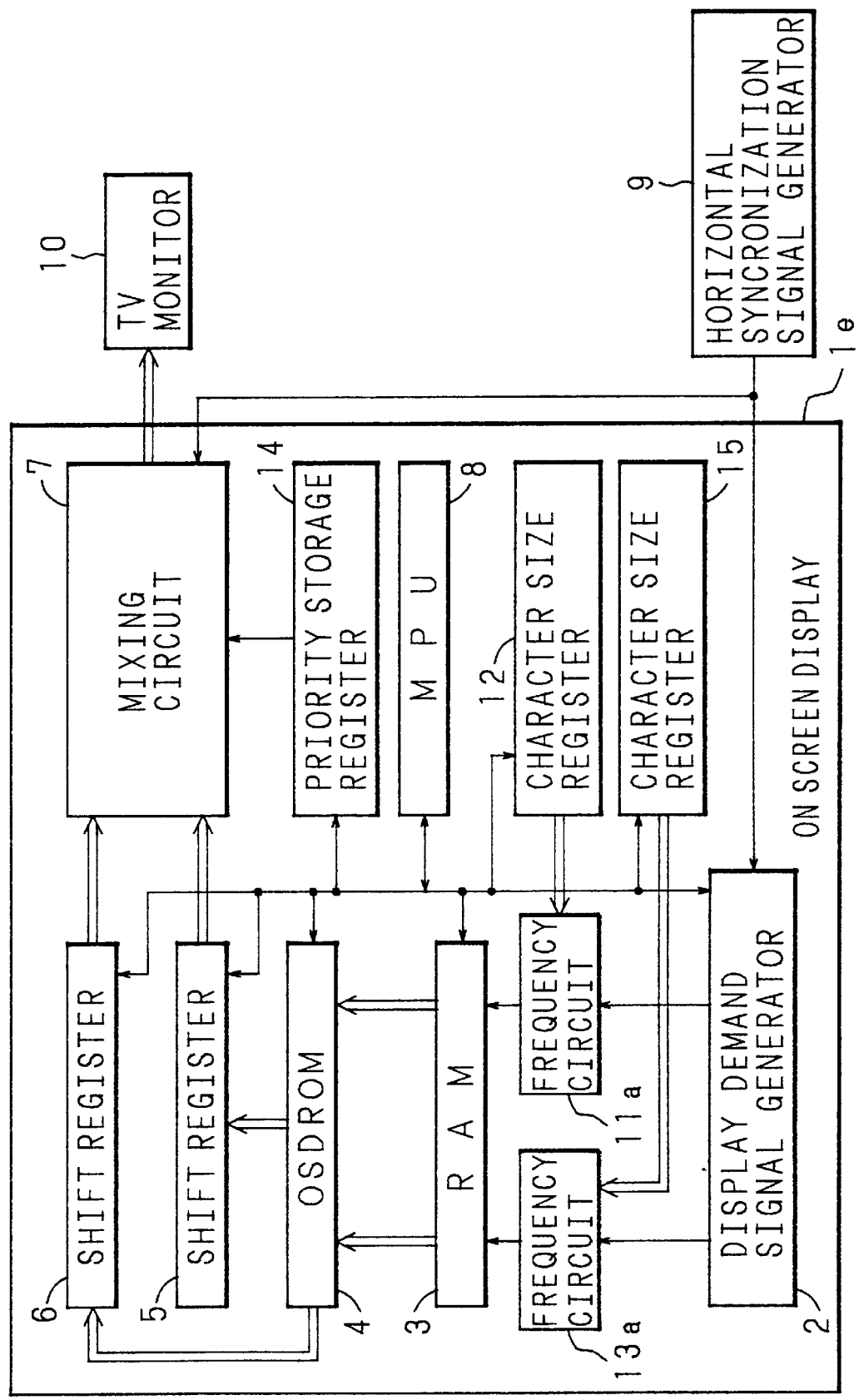
FIG. 10 is a block diagram of the configuration of an OSD of Embodiment 5 of the invention.

In this manner, the OSD 1d can set the sizes of characters simultaneously displayed in two display areas independently. As a result, the ratio of the character sizes between the two display areas can be set in any ratio including a multiple of a decimal. Embodiment 5:

FIG. 10 is a block diagram of the configuration of still another exemplified OSD of the invention. The OSD 1e takes out two trains of pulses of a display demand signal generated by a display demand signal generator 2, one of which is divided by a frequency divider 11a to be inputted to a RAM 3, the other of which is divided by a frequency divider 13a to be inputted to the RAM 3. Character size registers 12 and 15 receive and store signals corresponding to dividing ratios of the frequency dividers 11a and 13a inputted by an MPU 8, and supplies their contents to the frequency dividers 11a and 13a, respectively. Thus, the dividing ratios of the frequency dividers 11a and 13a are set. The rest of the configuration is identical to that of the OSD 1c of Embodiment 3 shown in FIG. 7, and hence like reference numerals are used to refer to like elements and the description is omitted.

When, for example, the character size register stores "00", the dividing ratio of the corresponding frequency divider is set to be 1 (i.e., to perform no division). When the character size register stores "01", the dividing ratio of the frequency divider is set to be ½, when it stores "10", the dividing ratio is set to be ⅓, and when it stores "11", the dividing ratio is set to be ¼.

The OSD 1e can select the sizes of characters to be displayed in the respective display areas with ease by merely using the frequency dividers 11a and 13a and the corresponding character size registers 12 and 15, without largely increasing the circuit scale.

In the aforementioned embodiments, the number of the display areas is described as two, but the invention can be easily applied to three or more display areas.

In addition, it goes without saying that the dividing ratios mentioned above do not limit the invention.

In accordance with the OSD of the invention, it is possible to simultaneously display a plurality of display areas just as using a plurality of OSDs, without largely increasing the circuit scale. When a plurality of display areas overlap, it can be selected that any of the display areas is to be priorly displayed or the display areas are overlapped. Furthermore, it is possible to enlarge the characters or patterns to be displayed, and to select a desired size for the characters or patterns. It is also possible to set the sizes of the characters or patterns in a plurality of display areas differently from one another.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An OSD for displaying characters or patterns on a display screen, comprising:

a signal generator for generating a horizontal synchronization signal;

a display demand signal generator for outputting display demand signals for characters or patterns with regard to each group of a predetermined number of pixels starting from a selected pixel on the display screen, in synchronism with each group;

a first addressable memory for outputting codes corresponding to the characters or patterns stored therein, through a plurality of channels in response to the display demand signals;

a second addressable memory for outputting pixel data for the characters or patterns stored therein in accordance with the codes given through the plurality of channels in response to the codes outputted by the first memory;

a plurality of holding circuits each receiving the horizontal synchronization signal, temporarily holding the pixel data, and then outputting the pixel data synchronously with the horizontal synchronization signal;

a mixing circuit for using the respective pixel data outputted by the respective holding circuits as display signals for the display screen synchronously with a horizontal synchronization signal so that a plurality of the characters or patterns corresponding to the plurality of holding circuits are displayed in positions on the display screen; and a priority storage circuit for storing a display priority signal determining whether the pixel data from any of the holding circuits are used as the display signals or the pixel data from all the holding circuits are used as the display signals, when a plurality of the characters or patterns corresponding to the pixel data outputted by the plurality of holding circuits overlap on one pixel, wherein the mixing circuit uses the respective pixel data from the plurality of holding circuits as display signals in accordance with the contents of the priority storage circuit.

2. The OSD according to claim 1, wherein the display demand signal generator outputs display demand signals having a train of pulses, the OSD is additionally provided with a frequency divider for dividing the train of pulses of the display demand signals corresponding to the pixel data for the characters or patterns supplied to any of the plurality of holding circuits and outputting the divided train of pulses to the first memory, and the first memory outputs the codes corresponding to the characters or patterns at a speed in accordance with the divided train of pulses, thereby enlarging the size of the characters or patterns to be displayed as compared with characters or patterns corresponding to another train of pulses that has not been divided.

3. The OSD according to claim 2, further comprising:

an image size storage circuit for storing a signal corresponding to a dividing ratio for dividing the display demand signals, wherein the frequency divider determines its dividing ratio in accordance with the content of the image size storage circuit, and divides the display demand signals in the determined dividing ratio.

4. The OSD according to claim 2, wherein the frequency divider is plural in number, and the plural frequency dividers divide the display demand signals in the respective dividing ratios.

5. The OSD according to claim 4, further comprising:

a plurality of image size storage circuits for storing signals corresponding to dividing ratios for dividing the display demand signals, wherein the frequency dividers determine their dividing ratios in accordance with the contents of the image size storage circuits, respectively, and divide the display demand signals in the determined dividing ratios.

6. An OSD for displaying characters or patterns on a display screen, comprising:

a signal generator for generating a horizontal synchronization signal;

a display demand signal generator for outputting display demand signals for characters or patterns with regard to each group of a predetermined number of pixels starting from a selected pixel on the display screen, in synchronism with each group;

a first addressable memory for outputting codes corresponding to the characters or patterns stored therein, through a plurality of channels in response to the display demand signals;

a second addressable memory for outputting pixel data for the characters or patterns stored therein in accordance with the codes given through the plurality of channels in response to the codes outputted by the first memory;

a plurality of holding circuits each receiving the horizontal synchronization signal, temporarily holding the pixel data, and then outputting the pixel data synchronously with the horizontal synchronization signal;

a mixing circuit for using the respective pixel data outputted by the respective holding circuits as display signals for the display screen synchronously with a horizontal synchronization signal so that a plurality of the characters or patterns corresponding to the plurality of holding circuits are displayed in positions on the display screen; wherein the display demand signal generator outputs display demand signals having a train of pulses, the OSD is additionally provided with a frequency divider for dividing the train of pulses of the display demand signals corresponding to the pixel data for the characters or patterns supplied to any of the plurality of holding circuits and outputting the divided train of pulses to the first memory, and the first memory outputs the codes corresponding to the characters or patterns at a speed in accordance with the divided train of pulses, thereby enlarging the size of the characters or patterns to be displayed as compared with characters or patterns corresponding to another train of pulses that has not been divided.

7. The OSD according to claim 6, further comprising:

an image size storage circuit for storing a signal corresponding to a dividing ratio for dividing the display demand signals, wherein the frequency divider determines its dividing ratio in accordance with the contents of the image size storage circuit, and divides the display demand signals in the determined dividing ratio.

8. The OSD according to claim 6, wherein the frequency divider is plural in number, and the plural frequency dividers divide the display demand signals in the respective dividing ratios.

9. The OSD according to claim 8, further comprising:

a plurality of image size storage circuits for storing signals corresponding to dividing ratios for dividing the display demand signals, wherein the frequency dividers determine their dividing ratios in accordance with the contents of the image size storage circuits, respectively, and divide the display demand signals in the determined dividing ratios.

* * * * *